(12) United States Patent
Ionov

(10) Patent No.: US 7,430,376 B1
(45) Date of Patent: Sep. 30, 2008

(54) ALL-OPTICAL DELAY GENERATOR FOR PPM COMMUNICATION SYSTEMS BASED ON A NON-LINEAR WAVEGUIDE WITH A CHIRPED DBR

(75) Inventor: Stanislav I. Ionov, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 623 days.

(21) Appl. No.: 10/999,553

(22) Filed: Nov. 29, 2004

(51) Int. Cl.
*H04B 10/04* (2006.01)
*H04B 10/12* (2006.01)

(52) U.S. Cl. .................. 398/189; 398/191; 398/186

(58) Field of Classification Search .......... 398/189, 398/190, 191, 186, 183, 84, 87, 31; 359/264, 359/276
See application file for complete search history.

(56) References Cited

U.S. PATENT DOCUMENTS

| | | | |
|---|---|---|---|
| 3,961,841 A | 6/1976 | Giordmaine | 350/160 R |
| 4,584,720 A | 4/1986 | Garrett | 455/608 |
| 4,923,264 A | 5/1990 | Langer et al. | 350/96.14 |
| 4,953,939 A | 9/1990 | Epworth | 350/96.19 |
| 5,082,342 A | 1/1992 | Wight et al. | 385/8 |
| 5,105,301 A | 4/1992 | Campi | 359/245 |
| 5,289,018 A | 2/1994 | Okuda et al. | 257/98 |
| 5,305,336 A | 4/1994 | Adar et al. | 372/18 |
| 5,608,566 A | 3/1997 | Dutta et al. | 359/248 |
| 5,715,265 A | 2/1998 | Epworth | 372/38 |
| 5,751,466 A | 5/1998 | Dowling et al. | 359/248 |
| 5,870,417 A | 2/1999 | Verdiell et al. | 372/32 |
| 5,912,999 A | 6/1999 | Brennan, III et al. | 385/37 |
| 6,014,237 A * | 1/2000 | Abeles et al. | 398/87 |
| 6,018,534 A | 1/2000 | Pan et al. | 372/6 |
| 6,167,072 A | 12/2000 | Zory, Jr. | 372/46 |
| 6,243,517 B1 | 6/2001 | Deacon | 385/50 |

(Continued)

FOREIGN PATENT DOCUMENTS

EP 0 545 401 A2 6/1993

(Continued)

OTHER PUBLICATIONS

Black, H.S., *Modulation Theory*, D. Van Nostrand Company, Inc., Toronto, pp. 282-298.

(Continued)

*Primary Examiner*—M. R. Sedighian

(57) ABSTRACT

An all-optical PPM modulator comprises one or more sources of trains of optical control pulses and optical signal pulses, the optical control and optical signal pulses being equally spaced, but differentiated from one another by at least having different optical wavelengths and/or polarizations prior to modulation. An electro-optic modulator, for example, amplitude modulates the control pulses using a signal. A chirped Bragg reflector in an non-linear waveguide receives both the amplitude modulated optical control signal pulses and unmodulated optical signal pulses at an entrance port thereof, the waveguide having a path length selected to achieve temporal overlap of the control and signal pulses in the waveguide. The chirped Bragg reflector is resonant to the optical signal pulses and off-resonant to the optical control pulse. The signal pulses reflect the in chirped Bragg reflector and exit an entrance port thereof while the control pulses either are absorbed or exit an exit port of the chirped Bragg reflector.

13 Claims, 4 Drawing Sheets

U.S. PATENT DOCUMENTS

| | | | | |
|---|---|---|---|---|
| 6,466,703 | B1 | 10/2002 | Ionov | 385/10 |
| 6,600,844 | B2 | 7/2003 | Ionov | 385/9 |
| 6,876,817 | B2 * | 4/2005 | Wada et al. | 398/79 |
| 7,206,509 | B2 * | 4/2007 | Beacken | 398/53 |

FOREIGN PATENT DOCUMENTS

| | | |
|---|---|---|
| WO | 01/77748 A2 | 10/2001 |
| WO | 01/78200 A2 | 10/2001 |

OTHER PUBLICATIONS

Gupta, K.C., "Microstrip Lines II: Fullwave Analyses, Design Considerations, and Applications," *Microstrip Lines and Slotlines*, 2nd Edition, pp. 61-115 (1996).

Haus, H.A., *Waves and Fields In Optoelectronics*, Prentice-Hall, Inc., Englewood Cliffs, New Jersey, pp. 235-239 (1984).

Jeong, S.-H., et al., "Polarization-Independent All-Optical Switching in a Nonlinear GaInAsP-InP Highmesa Waveguide With a Vertically Etched Bragg Reflector," *IEEE Journal of Quantum Electronics*, vol. 38, No. 7, pp. 706-715 (Jul. 2002).

Jeong, S.-H., et al., "Corrections to 'Polarization-Independent All-Optical Switching in a Nonlinear GaInAsP-InP Highmesa Waveguide With a Vertically Etched Bragg Reflector'," *IEEE Journal of Quantum Electronics*, vol. 38, No. 10, p. 1446 (Oct. 2002).

Jeong, S.-H., et al., "Polarization Insensitive Deep-Ridge Vertical-Groove DFB Waveguide for All-Optical Switching," *Electronics Letters*, vol. 37, No. 23, pp. 1387-1389 (Nov. 8, 2001).

Jinguji, K., "Synthesis of Coherent Two-Port Optical Delay-Line Circuit with Ring Waveguides," *Journal of Lightwave Technology*, vol. 14, No. 8, pp. 1882-1898 (Aug. 1996).

Matuscheck, N., et al., "Theory of Chirped Mirrors," *IEEE Journal of Selected Topics in Quantum Electronics*, vol. 4, No. 2, pp. 197-208 (Mar./Apr. 1998).

Nakatsuhara, K., et al., "All-Optical Set-Reset Operation in a Distributed Feedback GaInAsP Waveguide," *IEEE Photonics Technology Letters*, vol. 10, No. 1, pp. 78-80 (Jan. 1998).

Nakatsuhara, K., et al., "All-Optical Switching in a Distributed-Feedback GaInAsP Waveguide," *Applied Optics*, vol. 38, No. 18, pp. 3911-3916 (Jun. 20, 1999).

\* cited by examiner

ALL-OPTICAL DELAY GENERATOR FOR PPM COMMUNICATION SYSTEMS BASED ON A NON-LINEAR WAVEGUIDE WITH A CHIRPED DBR

TECHNICAL FIELD

This disclosure relates to an optically-controlled delay generator which may be used for a PPM modulator.

BACKGROUND INFORMATION

Many satellite and terrestrial optical communication systems require transmission of analog optical signals. A straightforward way to address this need is to modulate the amplitude (AM) of an optical carrier. This approach, however, suffers from a poor Signal to Noise Ratio (SNR). It is well known that broadband modulation schemes, which utilize higher bandwidth than that of the transmitted waveform, may improve the SNR over that achieved with AM. Pulse position modulation (PPM) is one of such techniques. In PPM, a shift in the pulse position represents a sample of the transmitted waveform, as shown in FIG. 1. It can be shown that for a given power, $SNR_{PPM} \propto SNR_{AM}(t_p/\tau)^2$, where $t_p$ is the spacing between un-modulated pulses and $\tau$—the pulse duration, respectively. See H. S. Black, Modulation Theory, D. Van Nostrand (1953).

The implementations of PPM for optical communications require new techniques for generating trains of optical pulses whose positions are shifted in proportion to the amplitude of a transmitted waveform. Typically a bandwidth of $\Delta f=1-10$ GHz and higher is of interest for inter-satellite communications. Since pulse repetition frequencies (PRF) of $1/t_p > 2 \Delta f$ are required for sampling a signal of bandwidth $\Delta f$, GHz trains of picosecond (ps) pulses are required for realizing the advantages of PPM. For example, an optical inter-satellite link designed to transmit waveforms with $\Delta f=10$ GHz bandwidth requires sampling rates of $PRF=1/t_p \geq 2\Delta f=20$ GHz. By employing 1-2 ps-long optical pulses, a 30 dB gain is realized over an AM system with equal optical power.

Trains of equally spaced optical pulses can be generated by mode-locked lasers. This is a mature technology that is currently entering commercial arena. The present inventor is also the inventor of two US patents that describe delay generators based on a chirped distributed Bragg reflector (chirped DBR) in an electro-optically-active waveguide. See U.S. Pat. Nos. 6,466,703 and 6,600,844. Such devices can be used for introducing temporal shifts to equally spaced mode-locked optical pulses and, thereby, achieve PPM. The present disclosure (as well as the second patent identified above) improves significantly the linearity of the delay generator disclosed by U.S. Pat. No. 6,466,703. The current disclosure also reduces considerably the complexity of the second approach proposed by U.S. Pat. No. 6,600,844.

U.S. Pat. No. 6,466,703 describes a delay generator based on a chirped DBR in an electro-optically-active waveguide. The delay of a reflected optical pulse is controlled by moving the reflection point in a chirped DBR structure via the electro-optic effect. This design enables large (up to hundreds of ps) temporal shifts, and such devices are being manufactured at HRL Laboratories in Malibu, Calif. Such delay generators, however, suffer from non-linearity at high frequencies, when changes in the transmitted waveform are faster than the round-trip time of an optical pulse in the devices. Such non-linearity is caused by EO-induced phase shifts experienced by already reflected (and therefore, delayed) optical pulses by subsequent changes in the transmitted waveform.

An improved design of an EO optical delay generator has been disclosed by U.S. Pat. No. 6,600,844. In this architecture, an optical pulse is reflected backward from an EO-controlled first waveguide with a DBR into a closely-coupled second waveguide, which is not affected by the EO effect. Since the reflected wave does not experience phase shifts from the voltage applied to the first waveguide, the improved EO delay generator should have much better linearity and a wider bandwidth. This improved design of a delay generator, however, is rather complicated. Moreover, one expects high optical losses in this device, since coupling between oppositely propagating optical waves in adjacent waveguides is much weaker than that between waves in a common waveguide.

This present disclosure proposes an optically-controlled delay generator, where the reflection point of signal pulses is not controlled by the EO effect, as in the two mentioned US patents, but rather by non-linear interaction between signal and control optical pulses. The proposed architecture does not suffer from the non-linearity of the first design, since reflected signal pulses do not interact efficiently with the counter-propagating control radiation. Secondly, the proposed design is less complex and more efficient than the second design, since it does not rely on evanescent coupling between two adjacent waveguides.

The following documents describe technology for making all-optical switches based on non-linear GaInAsP waveguides with uniform distributed Bragg reflectors (DBR):

K. Nakatsuhara, T. Mizumoto, R. Munakata, Y. Kigure, and Y. Naito, "All-Optical Set-Reset Operation in a Distributed Feedback GaInAsP Waveguide", IEEE Phot. Tech. Lett., vol. 10(1), 1998, pp. 78-80, the disclosure of which is hereby incorporated herein by reference.

K. Nakatsuhara, T. Mizumoto, E. Takahashi, S. Hossain, Y. Saka, B.-J. Ma, and Y. Naito, "All-Optical Switching in a Distributed-Feedback GaInAs Waveguide", App. Optics, vol. 38(18), 1999, pp. 3911-16, the disclosure of which is hereby incorporated herein by reference.

S.-H. Jeong, H.-C. Kim, T. Mizumoto, J. Wiedmann, S. Arai, M. Takenaka, and Y. Naito, "Polarization Insensitive Deep-Ridge Vertical-Groove DFB Waveguide for All-Optical Switching", Electron. Lett., vol. 37(23), 2001, pp. 1387-9, the disclosure of which is hereby incorporated herein by reference.

S.-H. Jeong, H.-C. Kim, T. Mizumoto, J. Wiedmann, S. Arai, M. Takenaka, and Y. Naito, "Polarization Independent All-Optical Switching in a Non-Linear GaInAsP-lnP High-mesa Waveguide with a Vertically Etched Bragg Reflector", IEEE J. Quant. Electron., vol. 38(7), 2002, pp. 706-15, the disclosure of which is hereby incorporated herein by reference.

I propose to employ the same technology for making optically-controlled delay lines based on non-linear waveguides with chirped DBRs.

BRIEF DESCRIPTION OF THE FIGURES

FIG. 3b is a top view of a chirped waveguide of FIG. 3a;

DETAILED DESCRIPTION

Figure 1:
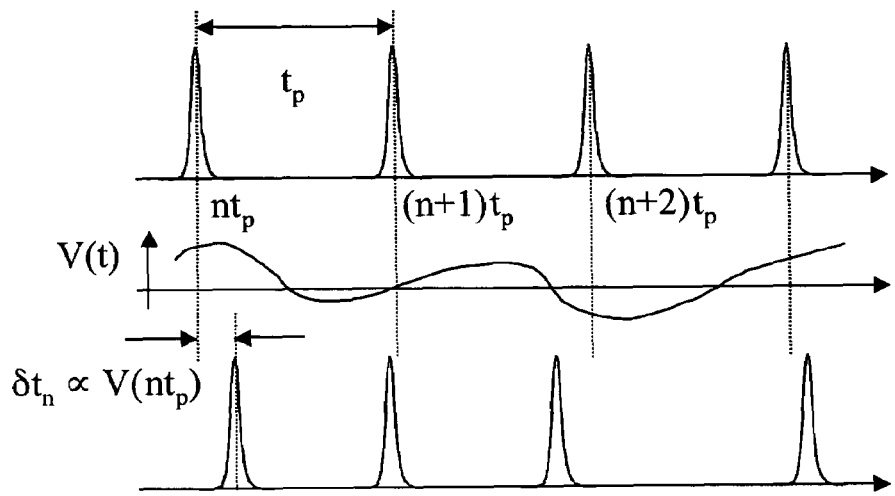
FIG. 1 depicts un-modulated pulses and modulated pulses using PPM to modulate a signal V(t)
Figure 2A:
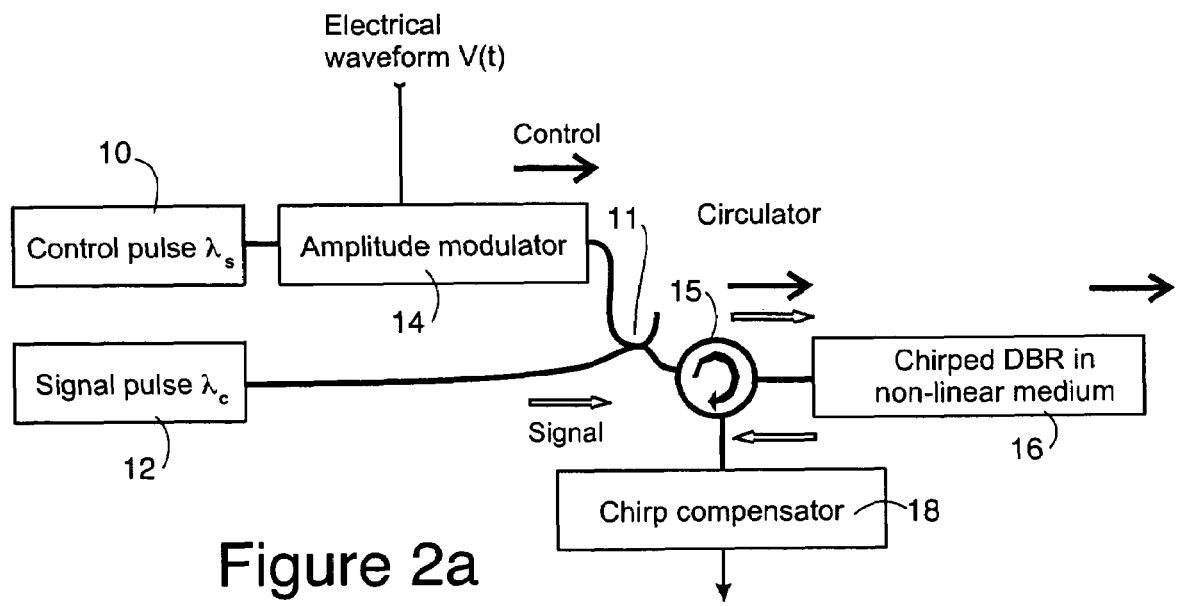
FIG. 2a is a schematic diagram of an all-optical PPM modulator with signal and control pulses produced by independent sources.
Figure 2B:
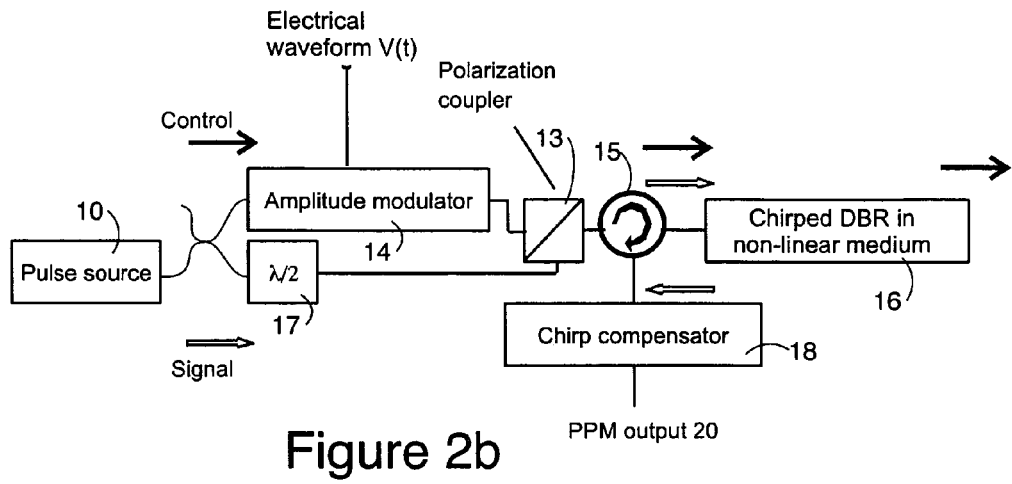
FIG. 2b is a schematic diagram of an all-optical PPM modulator with signal and control pulses from a single source.

A block diagram of one embodiment of an all-optical PPM modulator is shown in FIG. 2a while another embodiment is shown by FIG. 2b. In the embodiment of FIG. 2a, equally-spaced signal and control optical pulses are generated by mode locked lasers 10 and 12. Suitable lasers for this application are manufactured by Pritel Inc. The lasers 10 and 12 produce synchronized outputs at slightly different optical wavelengths $\lambda_s$ and $\lambda_c$, respectively. The amplitude of the control pulses is modulated in an EO modulator 14 (preferably a Mach-Zender LiNbO$_3$ modulator) in proportion to an electrical waveform V(t), which is to be transmitted as PPM pulses 20. The control and signal pulses are combined in a sampler 11 and launched into a non-linear waveguide with a chirped distributed Bragg reflector (DBR) 16. The relative path length of the control and signal pulses is chosen to achieve temporal overlap of the two pulses in the waveguide 16.

Alternatively, in the embodiment of FIG. 2b the signal pulses are split-off by an optical tap 11 from a control pulse source 10 and their polarization is rotated by 90 degrees by a polarization rotator 17 before being combined again by polarization coupler 13 and launched into the non-linear waveguide with a chirped DBR 16.

Alternatively, element 17 could be a wavelength converter, in which case the two beams are combined together by a coupler 11, as in the case of the embodiment of FIG. 2a.

In FIGS. 2a and 2b, the solid arrows show the flow of control pulses while the outlined arrows show the flow of signal pulses.

An optical circulator 15 is preferably used direct the combined signal and control pulses to the DBR 16 and to direct reflected signal pulses from the DBR 16 to a chirp compensator 18.

Figure 3A:
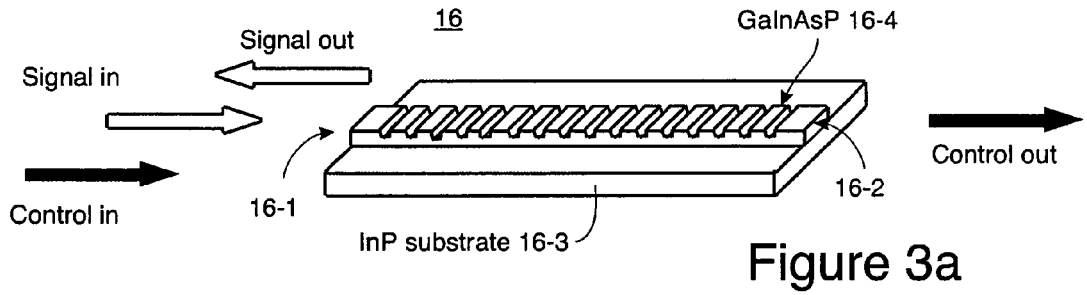
FIG. 3a is a perspective view of a chirped waveguide with non-parallel walls in the guiding region.
Figure 3B:
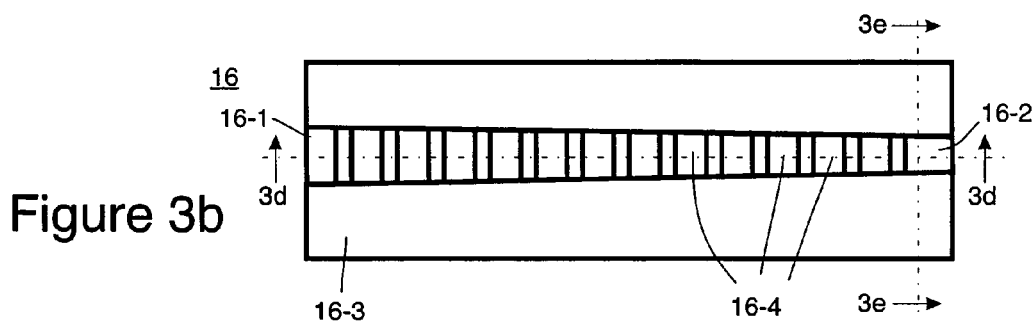
Figure 3C:
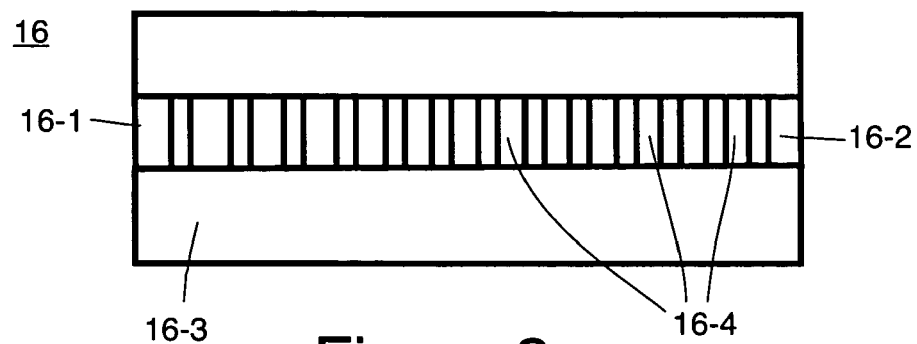
FIG. 3c is a top view of a another embodiment of a non-linear chirped waveguide similar to FIG. 3a, but with parallel sidewalls and a chirped period.

The DBR 16 is resonant with the signal pulses and off-resonance with the control pulses. In the case of signal and control pulses having the same wavelength but opposite polarization, the DBR 16 should have sufficient birefringence to reflect the signal pulses back towards circulator 15 and transmit the control ones. Typically, such waveguide birefringence occurs naturally and it is very hard to get rid of, even if one so desires. The reflector is chirped, i.e., the DBR resonance conditions $$\lambda = 2n(z)\Lambda(z) \quad [\text{Eq. 1}]$$

change linearly along the guide. This can be achieved by changing either the period of the DBR $\Lambda(z)=\Lambda_o+\Lambda'z$ or the width of the guiding region $w(z)=w_o+w'z$, which changes the effective refractive index of the waveguide $n(z)=n_o+n'z$. In both cases, the resonant wavelength changes linearly along the waveguide:

$$\Lambda(z)=\Lambda_o+\Lambda'z=\Lambda_o+(\Delta\lambda/L)z, \quad [\text{Eq. 2}]$$

where $\Lambda_o$ is the central wavelength, $\Delta\Lambda$ is the spectral width and L is the length of the DFB, respectively. In the embodiment of waveguide shown in FIGS. 3a and 3b, the width of the guiding region is varied in a linear fashion and the period of the DBR is held constant. Alternatively, the width of the guiding region may remain constant while the period of the DBR is varied, as shown by the embodiment of FIG. 3c. Also, both the width of the guiding region and the period of the DBR could both be varied, if desired.

The presence of the control pulse changes the refractive index of the waveguide material $n(I_c)=n+n_2I_c$, where $I_c$ is the intensity of the control pulse, $n=3.3$ and $n_2=-5.5 \cdot 10^{-12}$ cm$^2$/W for $\lambda=1550$ nm in a compound semiconductor such as GaInAsP with a $\lambda_g=1420$ nm bandgap. Therefore, the central wavelength of the DBR is affected by the control pulse:

$$\lambda_o(I_c)=\lambda_o+2n_2I_c\Lambda_o=\lambda_o+n_2I_c\lambda_o/n.$$

And so is the reflection point of the signal pulse, which is determined from $$\lambda_c=\lambda_o(I_c)+(\Delta\lambda/L)z=\lambda_o+n_2I_c\lambda_o/n+(\Delta\lambda/L)z.$$

The reflection point and optical pulse delay and the corresponding delay are given by $$z=(\lambda_c-\lambda_o)L/\Delta\lambda-n_2I_c\lambda_o L/n\Delta\lambda$$

and $$\Delta t = T_o - 2n_2I_c\lambda_o L/c\Delta\lambda, \quad [\text{Eq. 3}]$$

respectively. As evident from the equation immediately above, the delay of the signal pulse is proportional to the intensity of the control pulse.

As one may see, the intensity dependent delay, $\Delta T(I_c) = 2n_2I_c\lambda_o L/c\Delta\lambda$, is proportional to the non-linear refraction index $n_2$ and the length of the DBR 16 L, while it is inversely proportional to its bandwidth $\Delta\lambda$. Therefore, it is beneficial to choose a material with the highest non-linearity and design a device with maximal length and minimal bandwidth.

The bandwidth $\Delta\lambda$ of the chirped DBR 16 should be minimized in order to get maximum delay $\Delta t$ for a given $\Delta n$. It should be kept in mind, however, that the bandwidth $\Delta\lambda$ cannot be chosen arbitrarily small—it may not be lower than the bandwidth of the signal pulses $$\delta\lambda_{FWHM} = \frac{0.315}{\tau_{FWHM}}\frac{\lambda^2}{c},$$

where $\tau_{FWHM}$ is the duration of the pulse (assuming that it has a sech-squared shape). For illustrative purposes, chose $\Delta\lambda$ to be a multiple of a the bandwidth of the optical pulses, i.e., $$\Delta\lambda = m\frac{0.315}{\tau_{FWHM}}\frac{\lambda^2}{c}, \quad [\text{Eq. 4}]$$

where m~1–3 is a multiplier. Combining Eq. 3 and 4, one gets $$\Delta t/\tau_{FWHM}=(6.3/m)(L/\lambda_o)n_2I_c=(6.3/m)(L/\lambda_o)n_2P_c/A \quad [\text{Eq. 5}]$$

where $P_c$ is the peak power of the control pulse and A~$10^{-8}$ cm$^2$ is the cross section area of the guiding region. For a reasonably low value of the peak power of the control pulse P=6W, one gets $\Delta n=n_2P_c/A=3.3 \cdot 10^{-3}$. Assuming m=2, L=3 mm and $\lambda=1.55$ μm, one gets $\Delta t/\tau_{FWHM}=20$ and the PPM SNR improvements $\Delta SNR=0.5(\Delta t/\tau_{FWHM})^2=23$ dB.

A chirp compensator 18 is preferably used at the output of the circulator 15 to compensate for dispersion acquired by the signal pulses in the non-linear chirped reflector 16 before appearing at the output of the disposed all-optical PPM modulator.

In a 20 G/s device, it is desirable to get maximum delay equal to one half of the pulse period, i.e., $\Delta t_{max}=25$ ps. This dictates that the intensity-dependent path length is $\Delta L(I_c)=0.138$ cm, which can be easily achieved in a 3 mm-long waveguide. The length of the device is limited by the material absorption, which is $\alpha=1$ cm$^{-1}$ for GaInAsP. The absorption has a negative effect on the device performance, since decreasing intensity of the control pulse along the length of the waveguide results in a corresponding variation in the non-linear refractive index change and spectral distortions of the DBR in the moving frame of the optical pulses. Such distortion may be partially compensated if one uses tapering for achieving chirp in the DBR 16, as becomes clear from the following illustrative example.

Figure 4:
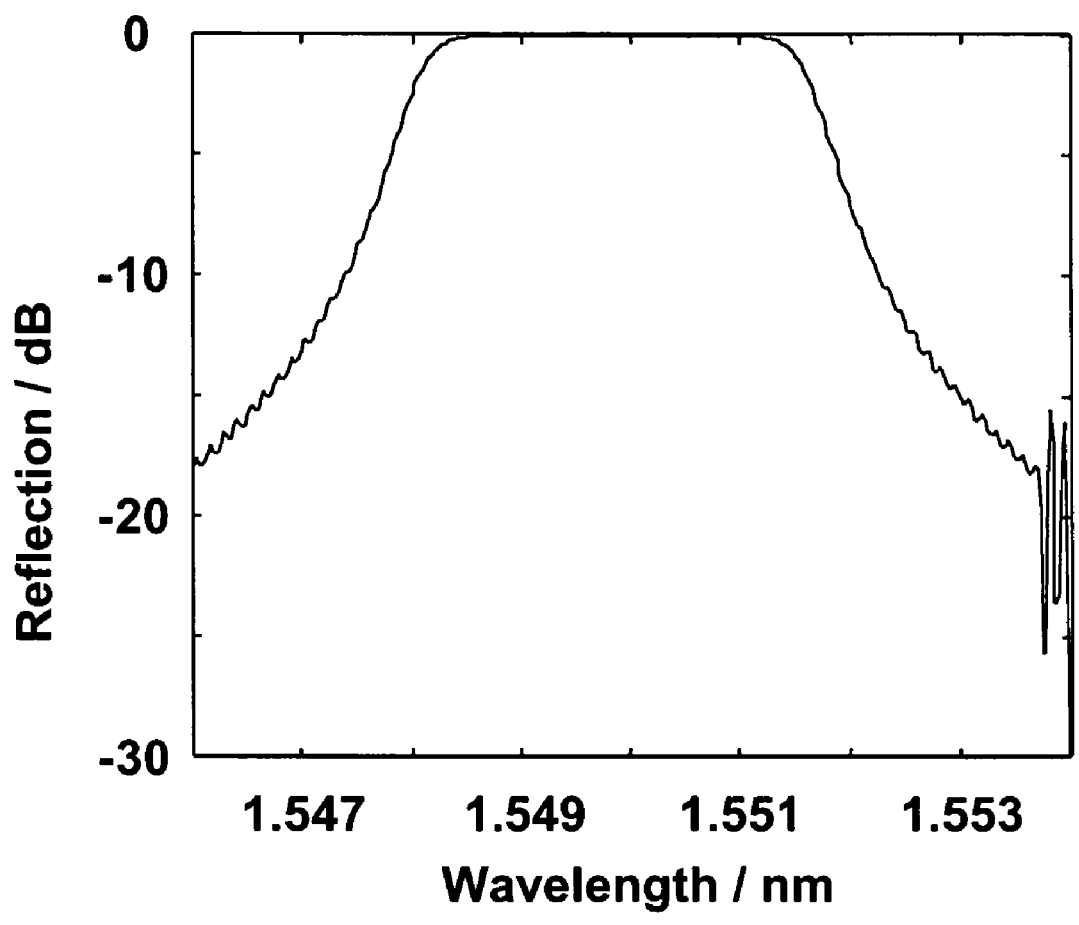
FIG. 4 is a graph of the reflection spectrum of a tapered waveguide.

If one wants to optimize the SNR advantages of PPM for such pulse period and maximum delay, optical pulses with $\tau_{FWHM}=\Delta t/20=1.25$ ps should be used, whose spectral width is approximately $\delta\lambda_{FWHM}=2$ nm. To reflect such pulses, chirped waveguides with a bandwidth of $\Delta\lambda=3\div4$ nm are required. FIG. 4 shows the reflection spectrum of a tapered slab (i.e., two-dimensional) waveguide with its core refraction index n=3.3 equal to that of GaInAsP and cladding with n=1. The spectrum is obtained by intergrating numerically the coupled-mode equations describing DBRs (See H. A. Haus, "Waves and Fields in Optoelectronics", Prentice-Hall, Englewood Cliffs, 1984, pp. 235-9). A tapered slab waveguide is depicted by FIGS. 3a and 3b where a waveguide is formed in a slab 16-3 of a semiconductor material, preferably InP/InGaAsP having a waveguide entrance 16-1 and a waveguide exit 16-2. The waveguide includes, in this embodiment, a periodic DBR reflector structure comprising a crenulated structure 16-4 of another semiconductor material, for example InGaAsP or formed in a thin cladding layer on InP disposed on a InGaAsP slab or layer. The embodiment of FIG. 3c is also preferably made of such materials. But instead of the side walls being tapered, the DBR reflector period changes linearly along the longitudinal length of the device.

Figure 3D:
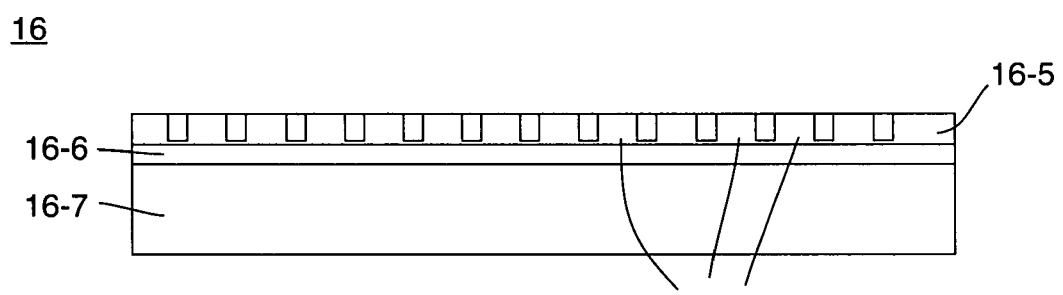
FIG. 3d is a cut away side view of a waveguide DBF.
Figure 3E:
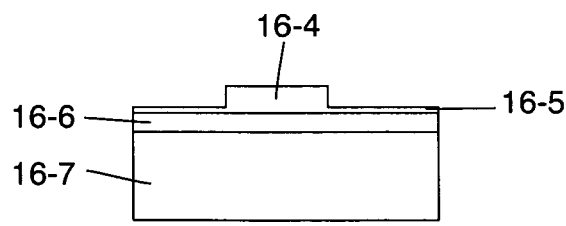
FIG. 3e is en end view of a waveguide DBF.

FIGS. 3d and 3e are section views through the waveguide taken along the section lines shown in FIG. 3b. In this embodiment, a higher index slab or layer 16-6 of InGAAsP material, for example, is formed preferably by molecular beam epitaxy (MBE) and on a substrate 16-7 of InP material, for example. The crenulated structure 16-4 may be formed in layer 16-6 itself or in a thin cladding layer, such as is depicted for this embodiment, where cladding layer 16-5 is preferably formed of InP material disposed on layer 16-6.

The DBR period $\Lambda\approx0.23$ μm is chosen for achieving Bragg resonant conditions at $\lambda=1.55$ μm, the width of the waveguide is tapered down so that $\Delta d/d=5\%$ from a 1.025 μm width at its entrance 16-1 to a 0.975 μm width at its output 16-2. Such a slab waveguide illustrates qualitative features of three-dimensional ridge waveguides depicted in FIGS. 3a and 3b. The exact taper required for achieving the required amount of chirp can be determined experimentally by trial and error. The combined effect of absorption and DBR tapering on the intensity of the control pulse is given by $$I_c(z)/I_c(0)=\exp(-\alpha z)/(1-\Delta dz/L)\approx 1-z(\alpha-\Delta d/L), \quad [\text{Eq. 6}]$$

where $\Delta d/d=5\%$ is the relative taper of the waveguide from its entrance 16-1 to the exit 16-2. As one can see from Eq.6, the taper term works against the absorption term, and ideally they cancel each other. In the given example, however, the compensation is only modest—the intensity degradation is reduced from ~30% to ~25%. Such compensation may be improved if one chooses other values for $\Delta d$ and L, trading off other performance characteristics.

Finally, it should be noted that the bandwidth of the disclosed device is not limited by the round-trip time of a signal pulse (which is less than 66 ps for the given design parameters). Indeed, the effective index change, which is experienced by a forward-propagating signal pulse, is controlled by the co-propagating control pulse. The index change experienced by a reflected signal pulse during a collision with a counter-propagating control pulse is very brief and, therefore, negligible. Therefore, there are believed to be no adverse effects from the presence of several consecutive control pulses in the waveguide simultaneously—signal pulses interact efficiently with their co-propagating control pulses only. The bandwidth of the delay generator is limited by the bandwidth of the amplitude modulator, which may be as high as 40 GHz. GaInAsP waveguides with known birefringence may be manufactured according to the instructions provided in a number of the last-mentioned prior art documents cited above and using current prescriptions for choosing chirp and length. The manufacturing techniques described in the afore-described documents yield uniform (i.e., non-chirped) DBRs with 100% reflection efficiency at the center of the stop-band.

The control pulses are depicted as exiting the waveguide. Since there pulses need not be reused, they may be simply absorbed or discarded, as desired.

From the foregoing description, it will be apparent to those skilled in the art that the present invention has a number of advantages, some of which have been described above, and others of which are inherent in the embodiments of the invention described herein. Also, it will be understood that modifications can be made to the disclosed apparatus described herein without departing from the teachings described herein. As such, the invention is not to be limited to the described embodiments except as required by the appended claims.

What is claimed is:

1. An all-optical PPM modulator comprising:
   (i) one or more sources of trains of optical control pulses and optical signal pulses, the optical control and optical signal pulses being equally spaced, but differentiated from one another by at least having different optical wavelengths and/or polarizations prior to modulation;
   (ii) an modulator for amplitude modulating the control pulses with a signal; and
   (iii) a chirped Bragg reflector in an optically non-linear waveguide for receiving both the amplitude modulated optical control signal pulses and unmodulated optical signal pulses at an entrance port thereof, the waveguide having a path length selected to achieve temporal overlap of the control and signal pulses in the waveguide, the chirped Bragg reflector being resonant to the optical signal pulses and off-resonant to the optical control pulses, the signal pulses reflecting in the chirped Bragg reflector and exiting an entrance port of the chirped Bragg reflector while the control pulses either are absorbed or exit an exit port of the chirped Bragg reflector.

2. The all-optical PPM modulator of claim 1 further including a chirp compensator for applying chirp compensation to the signal pulses exiting the entrance of the chirped Bragg reflector.

3. The all-optical PPM modulator of claim 1 wherein a circulator is provided to receive the amplitude modulated optical control signal pulses and unmodulated optical signal pulses and apply them to the entrance port of the chirped Bragg reflector and to receive the signal pulses from the entrance port of the chirped Bragg reflector and to communicate them towards an output of the PPM modulator.

4. The all-optical PPM modulator of claim 1 wherein the chirped Bragg reflector in the optically non-linear waveguide comprises an elongated, crenulated semiconductor structure having a longitudinal axis which is parallel to a longitudinal axis of the waveguide, the waveguide being formed of a different semiconductor material than the semiconductor material forming the crenulated semiconductor structure.

5. The all-optical PPM modulator of claim 4 wherein the waveguide has non-parallel side walls facing crenulated semiconductor structure, the crenulated semiconductor structure having a constant periodicity.

6. The all-optical PPM modulator of claim 4 wherein the waveguide has parallel side walls facing crenulated semiconductor structure, the crenulated semiconductor structure having a varying periodicity along the longitudinal axis of the crenulated semiconductor structure.

7. The all-optical PPM modulator of claim 4 wherein the waveguide is InP and the crenulated semiconductor structure is GaINAsP.

8. The all-optical PPM modulator of claim 1 wherein the one or more sources of trains of optical control pulses and optical signal pulses comprise first and second mode locked lasers producing synchronized pulse trains at different optical wavelengths.

9. The all-optical PPM modulator of claim 1 wherein the one or more sources of trains of optical control pulses and optical signal pulses comprise a laser producing a pulse train at a given optical wavelength, a splitter for splitting the pulse train from the laser into two trains, one of the trains being amplitude modulated and the polarization of one of the two trains being rotated by 90 degrees relative to the other train, the two trains being combined by a polarization coupler.

10. The all-optical PPM modulator of claim 1 wherein the modulator is an electro-optic modulator.

11. A method of pulse position modulating a signal, the method comprising;
  (i) providing trains of optical control pulses and optical signal pulses, the optical control and optical signal pulses being equally spaced, but differentiated from one another by at least having different optical wavelengths and/or polarizations prior to modulation;
  (ii) amplitude modulating the control pulses by the signal by modulator;
  (iii) applying both the amplitude modulated optical control signal pulses and unmodulated optical signal pulses to a chirped Bragg reflector in an optically non-linear waveguide having a path length selected to achieve temporal overlap of the control and signal pulses in the waveguide, the chirped Bragg reflector being resonant to the optical signal pulses and off-resonant to the optical control pulses, the signal pulses reflecting the in chirped Bragg reflector and exiting an entrance of the chirped Bragg reflector while the control pulses either are absorbed or exit an exit port of the non-linear chirped Bragg reflector; and
  (iv) collecting the signal pulses exiting the entrance of the chirped Bragg reflector.

12. The method of claim 11 wherein the modulator is an electro-optic modulator.

13. The method of claim 11 wherein the chirped Bragg reflector in the optically non-linear waveguide comprises an elongated, crenulated semiconductor structure having a longitudinal axis which is arranged parallel to a longitudinal axis of the waveguide, the waveguide being formed of a different semiconductor material than the semiconductor material forming the crenulated semiconductor structure.

* * * * *